R. B. RANSOM.
ROTARY VALVE.
APPLICATION FILED OCT. 18, 1913.
1,108,002.
Patented Aug. 18, 1914.
2 SHEETS—SHEET 2.
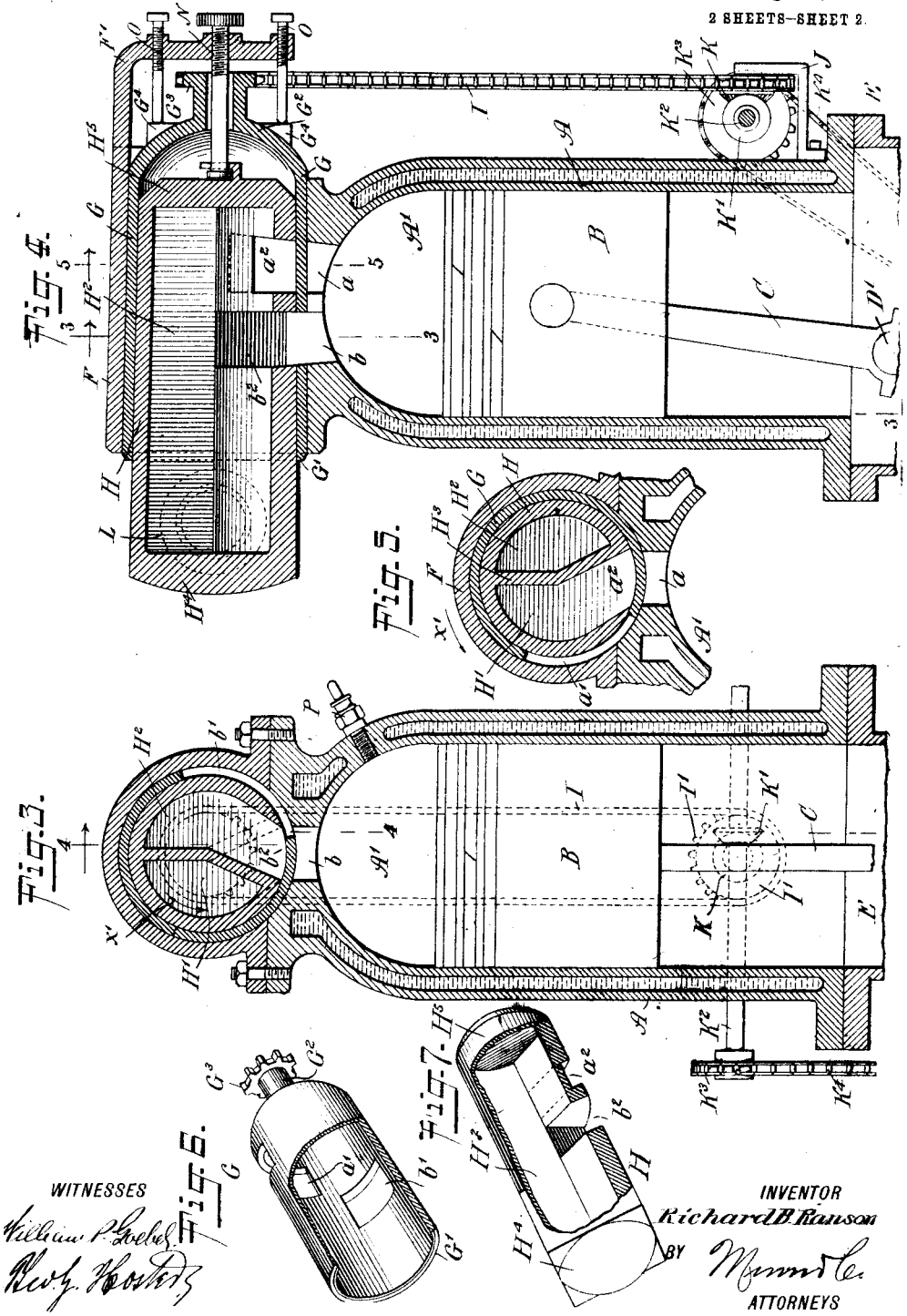
WITNESSES
INVENTOR
Richard B. Ransom
BY
ATTORNEYS

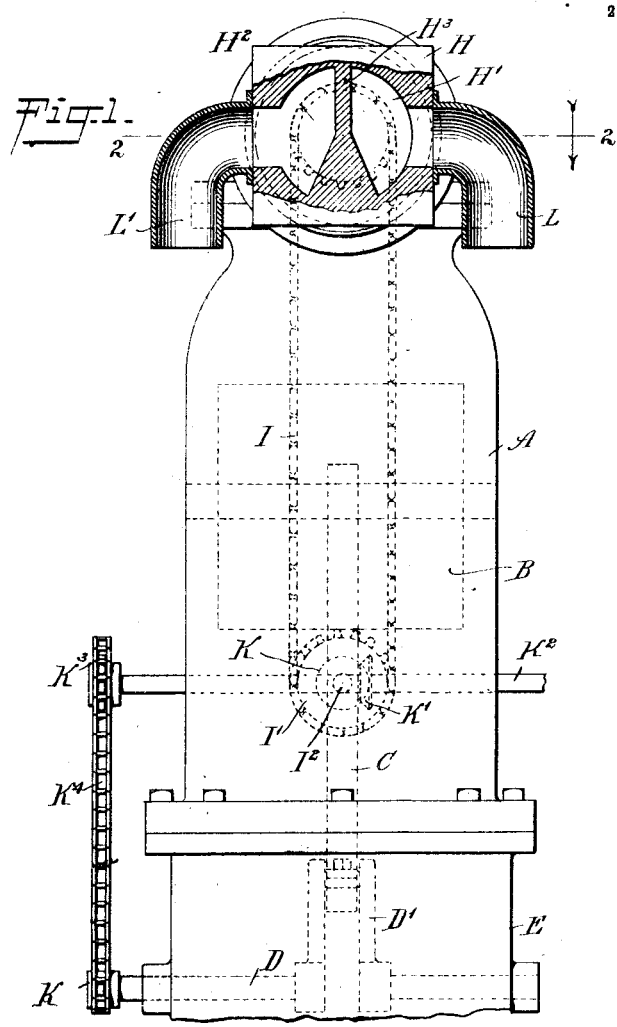
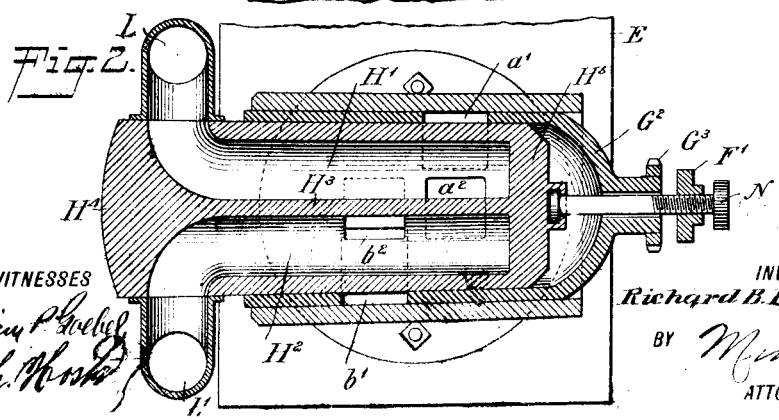

UNITED STATES PATENT OFFICE.

RICHARD BRUCE RANSOM, OF SUTHERLAND, FLORIDA.

ROTARY VALVE.

1,108,002.　　　　Specification of Letters Patent.　　Patented Aug. 18, 1914.

Application filed October 18, 1913. Serial No. 795,880.

*To all whom it may concern:*

Be it known that I, RICHARD B. RANSOM, a citizen of the United States, and a resident of Sutherland, in the county of Pinellas and State of Florida, have invented a new and Improved Rotary Valve, of which the following is a full, clear, and exact description.

The invention relates to internal combustion engines, and its object is to provide a new and improved rotary valve arranged to cover the admission of the explosive mixture and the exhaust of the products of combustion in such a manner that the timing of the explosion is accurate and carbon deposits are prevented.

For the purpose mentioned use is made of a valve casing provided with admission and exhaust ports leading into the working chamber of the engine, a hollow valve mounted to rotate in the said valve casing and provided with ports adapted to register with the said admission and exhaust ports and a fixed shell fitting into the said hollow valve and provided with separate chambers and ports leading from the chambers and adapted to register with the said valve ports, one of the said chambers being connected with a source of motive agent supply and the other chamber being connected with an exhaust pipe for carrying off the products of combustion.

A practical embodiment of the invention is represented in the accompanying drawings forming a part of this specification, in which similar characters of reference indicate corresponding parts in all the views.

Figure 1 is a cross section of the rotary valve as applied to an internal combustion engine, shown in elevation; Fig. 2 is a sectional plan view of the same on the line 2—2 of Fig. 1; Fig. 3 is a cross section of the same on the line 3—3 of Fig. 4; Fig. 4 is a longitudinal central section of the same on the line 4—4 of Fig. 3; Fig. 5 is a cross section of the same on the line 5—5 of Fig. 4; Fig. 6 is a perspective view of the hollow valve with part broken out; and Fig. 7 is a similar view of the shell.

In the cylinder A of an internal combustion engine is mounted to reciprocate a piston B connected by a pitman C with the crank arm D' of the engine shaft D journaled in suitable bearings arranged in the crank case E on which the cylinder A is mounted. On the top of the cylinder A is secured or formed a valve casing F having a conical bore into which fits a correspondingly shaped hollow valve G provided with an inner tapering face onto which fits a correspondingly shaped shell H. The valve casing F is open at both ends while the hollow valve G has one end G' open while the other end $G^2$ is provided with a sprocket wheel $G^3$ connected by a sprocket chain I with a sprocket wheel I' secured on a shaft $I^2$ journaled in a bracket J attached to the cylinder A. On the inner face of the sprocket wheel I' is secured a bevel gear wheel K in mesh with a bevel gear wheel K' attached to a shaft $K^2$ provided at one outer end with a sprocket wheel $K^3$ connected by a sprocket chain $K^4$ with a sprocket wheel $K^5$ secured on the engine shaft D so that when the engine is running a rotary motion is transmitted from the engine shaft D to the valve G to rotate the latter in the direction of the arrow $x'$.

The inner end of the working chamber A' of the cylinder A is preferably hemispherical, as plainly indicated in Figs. 3 and 4, and into the said working chamber opens the admission port $a$ and the exhaust port $b$, the ports leading to the interior of the valve casing F. The valve G is provided in its wall with ports $a'$, $b'$, adapted to register with the ports $a$ and $b$, and the shell H is provided with ports $a^2$, $b^2$ adapted to register with the ports $a'$, $b'$. The shell ports $a^2$, $b^2$ open into an admission chamber H' and an exhaust chamber $H^2$ formed by providing the interior of the shell H with a longitudinally extending partition $H^3$, as plainly indicated in Figs. 2 and 5. The left-hand end $H^4$ of the shell H extends beyond the corresponding ends of the valve casing F and the valve G and to this projecting end $H^4$ are secured pipes L and L' connected with the ends of the chambers H' and $H^2$. The pipe L is connected with a suitable source of motive agent supply such as the carbureter of the engine, and the pipe L' is the exhaust pipe for carrying off the products of combustion to a suitable place of discharge. The ports $a^2$, $b^2$ are located directly opposite the ports $a$ and $b$ so that when the valve G is rotated in the direction of the arrow $x'$, as previously explained, then the port $a'$ registers with the ports $a^2$, $a$ at the time the piston B is on the suction stroke, so that the explosive mixture is drawn into the working chamber A' of the cylinder A by way of the pipe L, chamber H' and registering ports $a^2$, $a'$ and $a$. During the return stroke and the next following power stroke of the piston B the ports $a$ and $b$ are closed by the valve G, and when the piston B returns on the exhaust stroke the port $b'$ registers with the ports $b$, $b^2$ to allow the products of combustion to pass out of the working chamber A' by way of the ports $b$, $b'$ and $b^2$ and the chamber $H^2$ of the pipe L'. On the next following suction stroke the port $a'$ again moves into register with the ports $a^2$, $a$, and the above-described operation is repeated.

The casing F, the valve G and the shell H are made conical to insure a snug fit of the members mentioned with a view to prevent leakage of the motive agent or the exhaust and in order to take up wear of the contacting surfaces of the casing F, valve G and shell H, the following arrangement is made: A screw rod N is mounted to screw in a bracket F' forming part of the valve casing F and the said screw N extends through the hollow end $G^2$ of the valve G and is mounted to turn in the right-hand end $H^5$ of the shell H. On turning the screw rod N in one direction the shell H is drawn to the right so as to fit snugly within the valve G and the latter is moved by the shell H to the right so as to fit snugly into the valve casing F. The movement of the valve G to the right is limited by set screws O screwing in the bracket F' and abutting against lugs $G^4$ formed on the end $G^2$ of the valve G. The working chamber A' is provided with a suitable ignition device P to ignite the explosive mixture at the end of the compression stroke of the piston B. It is understood that the shell H is held against turning by the pipes L, L' which latter are held against movement by suitable bearings or supports, not shown.

From the foregoing it will be seen that by the arrangement described the valve G rotates properly intermediate the valve casing F and the shell H, and the ports $a'$, $b'$ register at the proper time with the ports $a$, $a^2$ and $b$, $b^2$ to insure a proper admission of the explosive mixture to the working chamber A' and a full and complete discharge of the products of combustion from the said working chamber.

It is understood that the gearing used for rotating the valve G from the main shaft D is so proportioned that the valve G turns in unison with the movement given to the piston D.

Having thus described my invention, I claim as new and desire to secure by Letters Patent:

1. A rotary engine valve, comprising a valve casing provided with a cylinder admission port and a cylinder exhaust port, the ports leading to the cylinder of the engine, a hollow valve fitted to rotate in the said casing, and a non-rotatable shell fitting into the said hollow valve, the said shell having a lengthwise extending partition dividing the shell into a supply chamber and an exhaust chamber, the said chambers having ports opposite the said admission and exhaust ports and the said valve having ports adapted to connect the said admission and exhaust ports with the corresponding ports in the said shell.

2. A rotary engine valve, comprising a valve casing provided with a cylinder admission port and a cylinder exhaust port, the ports leading to the cylinder of the engine, a hollow valve fitted to rotate in the said casing, and a non-rotatable shell fitting into the said hollow valve and provided with a lengthwise extending partition dividing the said shell into a supply chamber and an exhaust chamber, the said supply chamber having a port opposite the said admission port and the said exhaust chamber having a port opposite the said exhaust port, and the said valve having ports of which one is adapted to connect the said admission chamber port with the said cylinder admission port and the other valve port is adapted to connect the said cylinder exhaust port with the said exhaust chamber port.

3. A rotary engine valve, comprising a valve casing provided with a cylinder admission port and a cylinder exhaust port, the ports leading to the cylinder of the engine, a hollow valve fitted to rotate in the said casing, a non-rotatable shell fitting into the said hollow valve and provided with a supply chamber and an exhaust chamber, the said supply chamber having a port opposite the said admission port and the said exhaust chamber having a port opposite the said exhaust port, and the said valve having ports of which one is adapted to connect the said admission chamber port with the said cylinder admission port, and the other valve port is adapted to connect the said cylinder exhaust port with the said exhaust chamber port, the said shell projecting at one end beyond the said casing and the said valve, and pipes attached to the said projecting shell end and connected with the said chambers.

4. A rotary engine valve, comprising a valve casing provided with a cylinder admission port and a cylinder exhaust port, the ports leading to the cylinder of the engine, a hollow valve fitted to rotate in the said casing, and a non-rotatable shell fitting into the said hollow valve, the said shell having ports opposite the said admission and exhaust ports and the said valve having ports adapted to connect the said admission and exhaust ports with the corresponding ports in the said shell, the said valve having exteriorly and interiorly tapering faces and the said faces having a conical bore into which fits the exterior face of the said valve and the said shell having an exterior tapering face fitting onto the interior tapering face of the said valve.

5. A rotary engine valve, comprising a valve casing provided with a cylinder admission port and a cylinder exhaust port, the ports leading to the cylinder of the engine, a hollow valve fitted to rotate in the said casing, a non-rotatable shell fitting into the said hollow valve, the said shell having ports opposite the said admission and exhaust ports and the said valve having ports adapted to connect the said admission and exhaust ports with the corresponding ports in the said shell, the said valve having exteriorly and interiorly tapering faces and the said casing having a conical bore into which fits the exterior face of the said valve and the said shell having an exterior tapering face fitting onto the interior tapering face of the said valve, and means for adjusting the said shell relative to the said valve and the latter relative to the said casing.

6. A rotary engine valve, comprising a valve casing provided with a cylinder admission port and a cylinder exhaust port, the ports leading to the cylinder of the engine, a hollow valve fitted to rotate in the said casing, a non-rotatable shell fitting into the said hollow valve, the said shell having ports opposite the said admission and exhaust ports and the said valve having ports adapted to connect the said admission and exhaust ports with the corresponding ports in the said shell, the said valve having interiorly and exteriorly tapering faces and the said casing having a conical bore into which fits the exterior face of the said valve and the said shell having an exterior tapering face fitting onto the interior tapering face of the said valve, the small end of the said valve having a reduced hollow portion, a bracket on the said casing, and a screw screwing in the said bracket.

In testimony whereof I have signed my name to this specification in the presence of two subscribing witnesses

RICHARD BRUCE RANSOM.

Witnesses:
L. E. JOHNSON,
C. M. NAU, Jr.